United States Patent
Kielinen et al.

(10) Patent No.: US 9,688,217 B2
(45) Date of Patent: Jun. 27, 2017

(54) MANUFACTURE OF INTERIOR TRIM FOR A MOTOR VEHICLE

(71) Applicant: International Automotive Components Group North America, Inc., Southfield, MI (US)

(72) Inventors: Jeff Kielinen, Lake Orion, MI (US); Randy Reed, Fair Haven, MI (US)

(73) Assignee: International Automotive Components Group North America, Inc., Southfield, MI (US)

( * ) Notice: Subject to any disclaimer, the term of this patent is extended or adjusted under 35 U.S.C. 154(b) by 380 days.

(21) Appl. No.: 14/483,769

(22) Filed: Sep. 11, 2014

(65) Prior Publication Data

US 2016/0075081 A1    Mar. 17, 2016

(51) Int. Cl.
| | |
|---|---|
| *B29C 65/70* | (2006.01) |
| *B29C 65/00* | (2006.01) |
| *B60R 13/02* | (2006.01) |
| *B29C 44/12* | (2006.01) |
| *B29K 101/12* | (2006.01) |
| *B29L 31/30* | (2006.01) |
| *B29K 101/10* | (2006.01) |
| *B29K 711/08* | (2006.01) |
| *B29K 75/00* | (2006.01) |

(52) U.S. Cl.
CPC ...... *B60R 13/0256* (2013.01); *B29C 44/1257* (2013.01); *B29K 2075/00* (2013.01); *B29K 2101/10* (2013.01); *B29K 2101/12* (2013.01); *B29K 2711/08* (2013.01); *B29L 2031/3008* (2013.01); *B29L 2031/3041* (2013.01)

(58) Field of Classification Search
CPC ............................. B29C 65/70; B29C 66/472
See application file for complete search history.

(56) References Cited

U.S. PATENT DOCUMENTS

| | | |
|---|---|---|
| 4,610,620 A | 9/1986 | Gray |
| 5,385,036 A | 1/1995 | Spillane et al. |
| 5,562,797 A | 10/1996 | Phelps |
| 5,951,802 A | 9/1999 | Deeks |
| 6,004,498 A | 12/1999 | Fujii et al. |
| 7,644,969 B2 | 1/2010 | Foster et al. |
| 8,784,964 B2 | 7/2014 | Schaefer |
| 2008/0073807 A1* | 3/2008 | Cowelchuk ............ B29C 45/16 264/46.4 |
| 2013/0004702 A1 | 1/2013 | Schafer et al. |

* cited by examiner

*Primary Examiner* — Daniel Lee
(74) *Attorney, Agent, or Firm* — Grossman, Tucker, Perreault & Pfleger, PLLC

(57) ABSTRACT

A method of providing interior trim for a motor vehicle comprising forming a first interior trim article providing a first interior trim level, wherein the first article comprises a first article decorative covering overlying a first article cushion member and a first article substrate; and forming a second interior trim article having a base structure comprising the first interior trim article; wherein the second interior trim article provides a second interior trim level different from the first interior trim level; wherein the second interior trim article comprises a second article decorative covering and a second article cushion member overlying the base structure; wherein the first article decorative covering includes an elongated channel; wherein the second article decorative covering comprises a plurality of decorative covering segments joined at a joining seam; and wherein the joining seam is located in the elongated channel.

19 Claims, 4 Drawing Sheets

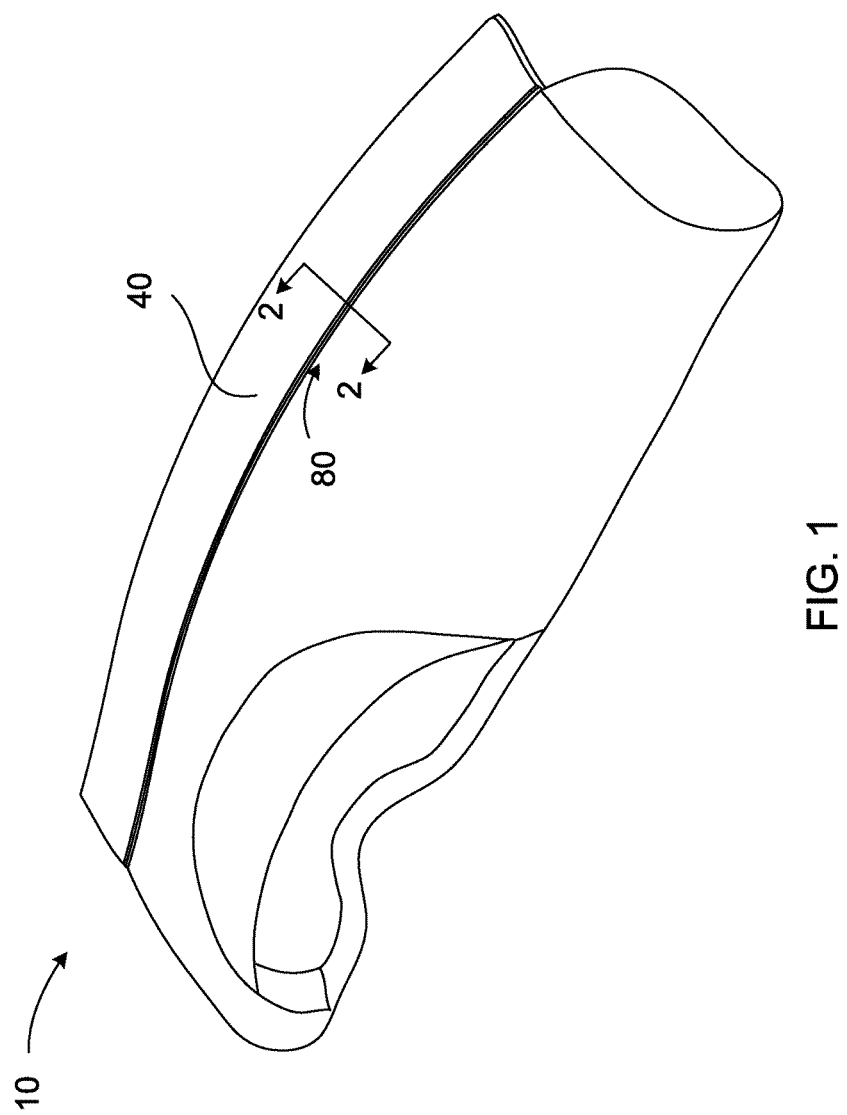

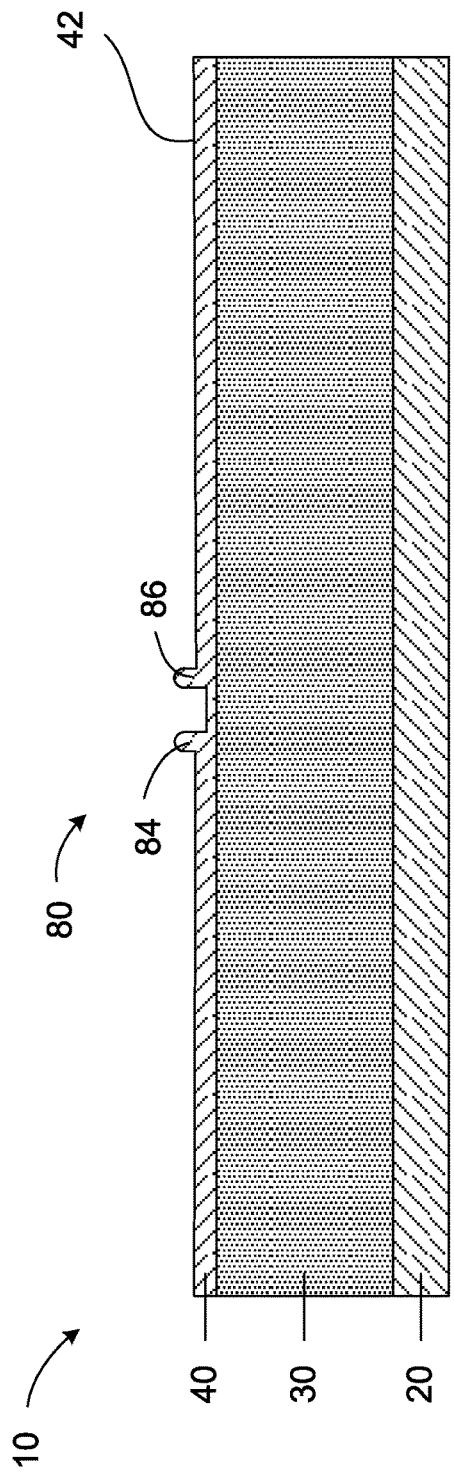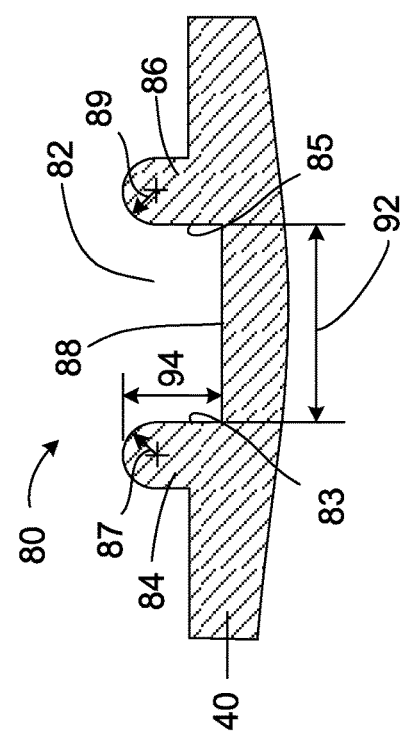
FIG. 2A
FIG. 2B

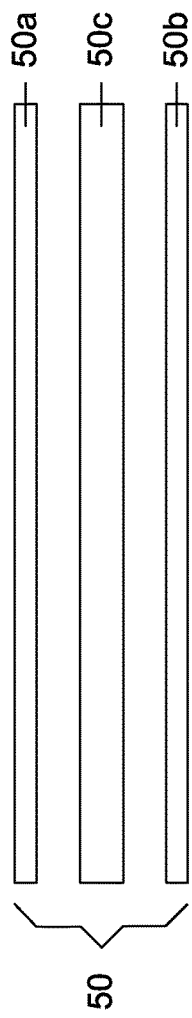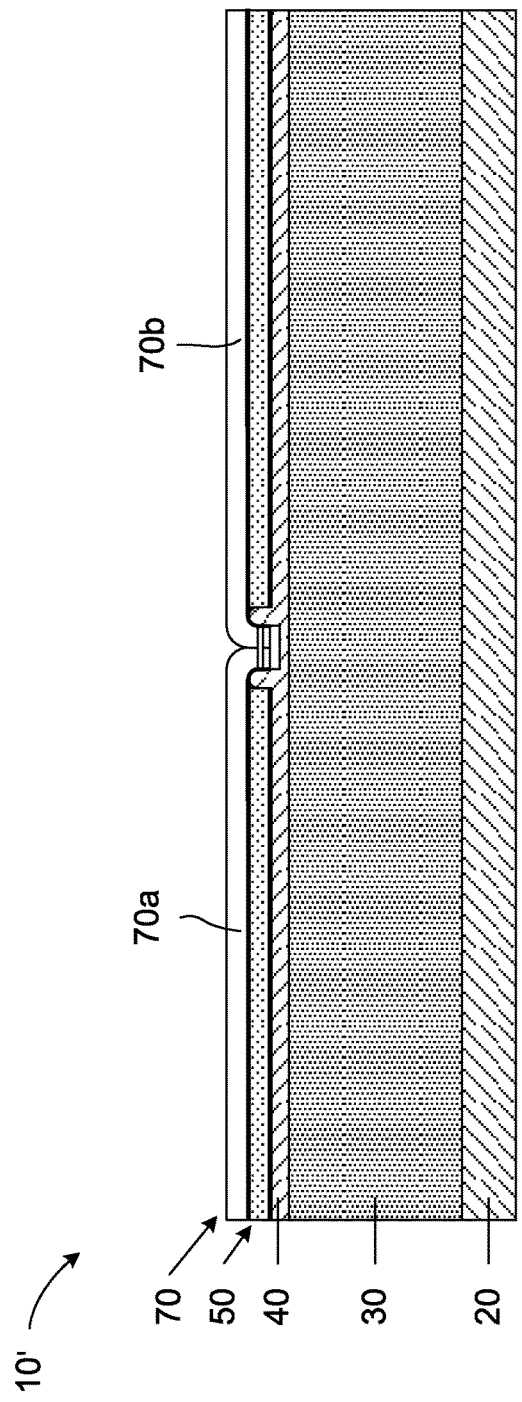

MANUFACTURE OF INTERIOR TRIM FOR A MOTOR VEHICLE

FIELD

The present disclosure relates to the manufacture of interior trim for a motor vehicle and, more particularly, to the manufacture of interior trim for a motor vehicle with differing interior trim levels.

BACKGROUND

Many motor vehicle manufactures typically provide a motor vehicle with different interior trim levels, which may be selected therefrom by a consumer based on preference. For example, for a particular motor vehicle, there may be a base interior trim level, an intermediate interior trim level and a top-of-the-line interior trim level. Unfortunately, the different interior trim levels often necessitate different tooling for the interior trim articles associated with each interior trim level, which increases manufacturing costs.

SUMMARY

As set forth above, many motor vehicle manufactures typically provide a motor vehicle with different interior trim levels, such as a base interior trim level and a top interior trim level, which may further include an intermediate interior trim level therebetween. Often the distinguishing feature between the various interior trim levels is that the top interior trim level is more luxurious than the lower interior trim levels. Such may be accomplished, for example, by replacing certain synthetic polymer surfaces, such as vinyl surfaces, with real (natural) leather.

In order to reduce the high cost associated with producing multiple interior trim levels for a particular motor vehicle, the present disclosure provides interior trim articles and methods of manufacture thereof wherein, for example, a top level interior trim article may be produced using a lower level interior trim article, such as a base or intermediate level interior trim article, with the luxury of the top level interior trim article building upon the luxury afforded by the lower level interior trim article.

According to at least one embodiment of the present disclosure, a method of providing interior trim for a motor vehicle is provided, with the method comprising forming a first interior trim article providing a first interior trim level, wherein the first article comprises a first article decorative covering overlying a first article cushion member and a first article substrate, with the first article cushion member located between the first article decorative covering and the first article substrate. The first interior trim article may then be used as a base structure in forming a second interior trim article. The second interior trim article provides a second interior trim level different from the first interior trim level, wherein the second interior trim article comprises a second article decorative covering and a second article cushion member overlying the base structure, with the second article cushion member located between the second article decorative covering and the base structure. In order to incorporate the second article decorative covering and a second article cushion member onto the base structure, i.e. first interior trim article, to form the second interior trim article, the first article decorative covering may include an elongated channel, and the second article decorative covering may comprise a plurality of decorative covering segments joined at a joining seam, wherein the joining seam is located in the elongated channel. The elongated channel may be defined by two opposing sidewalls, with at least a portion of at least one of the sidewalls formed by an elongated rib which protrudes outward from an upper side of the first article decorative covering.

Forming the second interior trim article from the first interior trim article as the base structure may comprise first positioning the second article cushion member relative to the first article decorative covering, particularly by arranging the second article cushion member over the first article decorative covering and locating the second article cushion member relative to the first article decorative covering using at least one of the elongated ribs as a positional locator, and thereafter positioning the second article decorative covering relative to the first article decorative covering by arranging the second article decorative covering over the first article decorative covering and locating the second article decorative covering relative to the first article decorative covering using the elongated channel as a positional locator.

Forming the second interior trim article from the first interior trim article as the base structure may further comprise bonding an upper side of the second article cushion member to a lower side of the second article decorative covering by applying heat and pressure in a mold, as well as bonding the lower side of the second article cushion member to an upper side of the first article decorative covering with the heat and pressure. Bonding may be performed by coating each of the upper side the second article cushion member, lower side of the second article cushion member, lower side of the second article decorative covering and upper side of the first article decorative covering with an adhesive coating prior to applying the heat and pressure.

FIGURES

The above-mentioned and other features of this disclosure, and the manner of attaining them, will become more apparent and better understood by reference to the following description of embodiments described herein taken in conjunction with the accompanying drawings, wherein:

FIG. 1 is perspective view of a first interior trim article according to the present disclosure;

FIG. 2A is a cross-sectional view of the first interior trim article of FIG. 1 taken along line 2-2 of FIG. 1;

FIG. 2B is a close-up cross-sectional view of the channel 80 formed in the decorative covering 40 of FIG. 2A;

FIG. 4 is an exploded view of the second article cushion member; and

FIG. 5 is an assembled view of a second interior trim article to be formed using the first interior trim article as a base structure.

DETAILED DESCRIPTION

Figure 3:
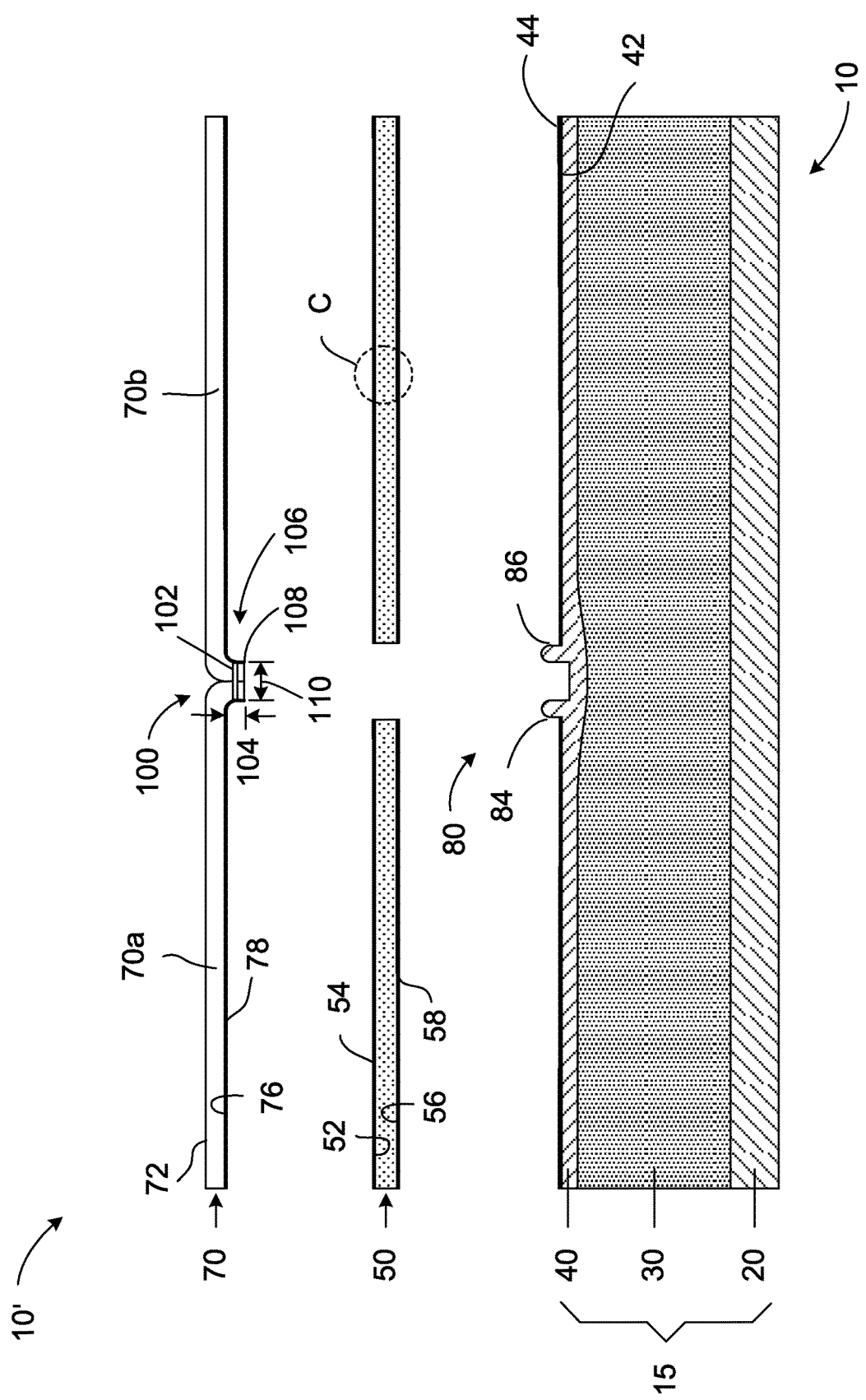
FIG. 3 is an exploded view of a second interior trim article to be formed using the first interior trim article as a base structure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to the figures, in FIG. 1 there is shown a first interior trim article 10 of a motor vehicle according to the present disclosure. The first interior trim article 10 provides a first interior trim level for the motor vehicle, which may be, for example, a base interior trim level or an intermediate interior trim level. The first interior trim article may be a trim panel and, more particularly, the trim panel may be an instrument panel, or a sidewall trim panel, such as a door trim panel or a quarter trim panel.

Referring to FIGS. 2A and 2B, first interior trim article 10 comprises a lower substrate 20, a cushion member 30 and an upper decorative covering 40. As shown, the first article decorative covering 40 overlies the first article cushion member 30 and the first article substrate 20, with the first article cushion member 30 located between the first article decorative covering 40 and the first article substrate 20.

First article substrate 20 may be formed of a rigid polymer composition, particularly by injection molding. First article substrate 20 may have a thickness in a range of 1.5 mm to 2.5 mm.

First article substrate 20 may comprise a polymer composition having a flexural modulus as measured in accordance with ASTM D-790-10 of at least 150,000 psi. at room temperature (23° C.) in order for substrate to provide sufficient rigidity to support first interior trim article 10. More particularly, the first article substrate 20 may have a flexural modulus as measured in accordance with ASTM D-790-10 in a range of 250,000-600,000 psi. at 23° C.

In addition to providing sufficient rigidity for first article substrate 20 of first interior trim article 10, the polymer composition for first article substrate 20 should also provide suitable heat resistance. As such, the first article substrate 20 may be formed of a polymer composition having a heat distortion temperature as measured in accordance with ASTM D-648-07 of at least 82° C. at 264 psi. More particularly, the first article substrate 20 may have a heat distortion temperature as measured in accordance with ASTM D-648-07 in a range of 82-110° C. at 264 psi.

The polymer composition may comprise, essentially consist of or consist of at least one thermoplastic synthetic polymer such as polypropylene (PP), acrylonitrile-butadiene-styrene (ABS), polycarbonate (PC), polycarbonate/acrylonitrile-butadiene-styrene (PC/ABS) or polyphenylene oxide (PPO).

First article decorative covering 40 may be formed of by of a flexible polymer composition, particularly by slush molding, rotational molding, injection molding or casting. First article decorative covering 40 may have a thickness in a range of 0.5 mm to 1.5 mm.

The polymer composition may comprise, essentially consist of or consist of at least one thermoplastic synthetic polymer such as plasticized polyvinyl chloride (PVC), thermoplastic urethane (TPU), thermoplastic olefin (TPO) elastomers, polyvinyl chloride acrylonitrile-butadiene-styrene (PVC-ABS), acrylonitrile-styrene-acrylic (ASA), blended elastomeric thermoplastic polymers and thermoplastic polyolefins (ETP-TPO).

A clearcoat layer (not shown), which may be formed of polyurethane, may be applied to the upper side 42 of the first article decorative covering 40. Upper side 42 may have a surface which is ungrained or grained, such as with a simulated leather grain.

First article cushion member 30 may be formed of a cellular structure, which may particularly provided by a resilient compressible foam. The foam may be formed from a polymer composition, particularly by open mold or closed mold foam-in-place molding. First article cushion member 30 may have a thickness in a range of 4 mm to 10 mm.

First article cushion member 30 may be formed in a foaming mold by placing the first article substrate 20 on a core of the foaming mold and the first article decorative covering 40 in the cavity of the foaming mold, and thereafter closing the foaming mold with the first article substrate 20 and the first article decorative covering 40 spaced from one another by the thickness of the first article cushion member 30. The first article cushion member 30 may then be formed by introducing foam reactant pre-cursor materials (e.g. polyol and isocyanate), to form a thermoset polymer (urethane foam) composition, in the space between the first article substrate 20 and the first article decorative covering 40. At the same time, the first article cushion member 30 bonds to the first article substrate 20 and the first article decorative covering 40 to form first interior trim article 10.

Referring now to FIG. 3, there is shown a second interior trim article 10' according to the present disclosure, which includes the first interior trim article 10 as a base structure 15 thereof. The second interior trim article 10' further comprises a second article decorative covering 70 and a second article cushion member 50 overlying the second article base structure 15, with the second article cushion member 50 located between the second article decorative covering 70 and the base structure 15.

With the second interior trim article 10' being formed with the a second article decorative covering 70 and a second article cushion member 50 overlying a base structure 15 comprising the first interior trim article 10, the second interior trim article 10' provides a second interior trim level different from the first interior trim level provided by the first interior trim article 10.

Second article decorative covering 70 may particularly comprise a real (natural) leather covering. In such case, the second interior trim article 10' may be understood to provide a higher level trim article of the motor vehicle than the first interior trim article 10 of the motor vehicle, when compared to the first interior trim article 10 making use of a first article decorative covering 40 formed of a synthetic polymer which simulates real (natural) leather.

As best shown by FIG. 4, second article cushion member 50 may comprise a sandwich structure formed of at least one layer of woven textile fabric 50c sandwiched between two opposing layers of scrim fabric 50a, 50b. A scrim fabric (e.g. open net, mesh, gauze) may be understood as a woven, nonwoven, or knitted fabric which is specifically described as having an open or loose configuration of strands. The second article cushion member 50 may also comprise a spacer fabric, such as a warp knitted textile spacer fabric as disclosed in U.S. Pat. No. 5,385,036 to Spillane entitled "Warp Knitted Textile Spacer Fabric, Method of Producing Same, and Products Produced Therefrom", hereby incorporated by reference in its entirety. The second article cushion member 50 may also comprise a combination of a woven fabric and a knitted fabric. The second article cushion member 50 may have a thickness in a range of 1 mm to 4 mm, and more particularly have a thickness in a range of 1.5 mm to 2.5 mm. Second article cushion member 50 may also comprise a low density foam (e.g. polyurethane), such as a preformed sheet stock.

In order to bond the second article base structure 15, second article cushion member 50 and the second article decorative covering 70 to one another, a spray adhesive coating 44 may be first applied to the upper side 42 of the second article base structure 15 (also the upper side of the first article decorative covering 40) and a spray adhesive coating 78 may be applied to the lower side 76 of the second article decorative covering 70. Similarly, a spray adhesive coating 54 may be applied to the upper side 52 of the second article cushion member 50 and a spray adhesive coating 58 may be applied to the lower side 56 of the second article cushion member 50. Spray adhesive coating 44, 54, 58 and 78 may comprise the same adhesive, or may be different adhesives. The adhesive for each of the adhesive coating 44, 54, 58 and 78 are preferably of the same chemical composition, which each adhesive comprising a water-based, heat-activated urethane applied at a wet weight of 80-120 grams/ square meter. After wet application, the adhesive may be dried in an oven for 10-15 minutes at 90-110° F. to provide adhesive coating 44, 54, 58 and 78 with the foregoing wet weight.

Once the adhesive coating 44, 54, 58 and 78 have been applied and allowed to dry to each of the upper side 42 of second article base structure 15, the lower side 76 of the second article decorative covering 70 and the opposing upper side 52 and lower side 56 of the second article cushion member 50, thereafter the second article base structure 15, second article cushion member 50 and second article covering 70 may then be placed in a forming mold in layered disposition and heated while being compressed against one another. Each adhesive coating 44, 54, 58 and 78 may be heated to a temperature of approximately 145° F. for 60-90 seconds, and then allowed to cool to room (ambient) temperature. The second interior trim article 10' may then be demolded.

Due to the size of the second interior trim article 10', and the difficulties associated with properly positioning the second article cushion member 50 and the second article decorative covering 70 relative to the second article base structure 15 and, more particularly, the first article decorative covering 40, it may be desirable to divide the second article cushion member 50 and the second article decorative covering 70 into multiple sections 70a, 70b and thereafter position the sections 70a, 70b with the aid of a created joining seam 100 therebetween.

With the creation of joining seam 100 held by stitch 102, there will be a seam allowance 106 located on the lower side 76 of the second article decorative covering 70. The seam 100, and more particularly the seam allowance 106, may then be located in an elongated U-shaped channel 80 of the first interior trim article 10. In such a manner, positioning the second article decorative covering 70 relative to the first article decorative covering 40 may be performed by arranging the second article decorative covering 70 over the first article decorative covering 40 and locating the second article decorative covering 70 relative to the first article decorative covering 40 using the elongated channel 80 as a positional locator. Also, by placement of the seam allowance 106 in the elongated channel 80, the seam allowance 106 is inhibited from appearing as a bulge in the upper (outer) side 72 of the second article decorative covering 70.

The elongated channel 80 may be defined by two opposing sidewalls 83, 85 with at least a portion of each sidewall 83, 85 being defined by an elongated rib 84, 86 which protrudes outward from an upper side 42 of the first article decorative covering 40. The elongated ribs 84, 86 may have a width in a range of 0.5 mm to 3 mm (preferably 1-1.5 mm) and a height of 0.5 to 3 mm (preferably 1-1.5 mm), as measured from upper side 42 of the first article decorative covering 40. In such a manner, positioning the second article cushion member 50 relative to the first article decorative covering 40 may be performed by arranging the second article cushion member 50 over the first article decorative covering 40 and locating the second article cushion member 50 relative to the first article decorative covering 40 using at least one of the elongated ribs 84, 86 as a positional locator.

In order to inhibit any bulging of the seam allowance 106, the channel 80 should have a depth 94 at least equal to the depth 104 of the seam allowance 106, which may be measured from the lower surface 76 of the second article decorative 70 to the raw edge 108 of the second article decorative covering 70 in the channel 80, preferably such that that raw edge 108 of the second article decorative covering 70 does not make contact with the lower wall 88 of the channel 80. However, the depth 94 of the channel 80 should not be made so long in proportion to the depth 104 of the seam allowance 106 such that the seam 100 sags in the channel 80, which can be just as unsightly as a seam bulge in the outer surface 72 of the second article decorative covering 70. As such, the depth 94 of the channel 80 should be no more than 50% greater than the depth 104 of the seam allowance 106. With a second article decorative covering 70 formed of leather, the channel may have a depth 94 in a range of 1.5 mm to 5 mm deep, and more particularly have a depth 94 in a range of 2 mm to 4 mm deep.

The channel 80 should have a width 92 at least equal to the width 110 of the seam allowance 106. However, the width 92 of the channel 80 should not be made so wide in proportion to the width 110 of the seam allowance 106 such that the seam allowance 106, once in the channel 80, does not accurately locate the second article decorative covering 70 relative to the base structure 15. As such, the width 92 of the channel 80 should be no more than 50% greater than the width 110 of the seam allowance 106. With a second article decorative covering 70 formed of leather, the channel may have a width 92 in a range of 2 mm to 4 mm wide, and more particularly have a width 92 in a range of 2.5 mm to 3.5 mm wide.

As set forth above, in order to properly locate cushion member(s) 50 on opposing sides of the channel 80, the opposing sidewalls of the channel 80 preferably defined in part by two opposing elongated raised ribs 84, 86 which extend above the adjacent upper surface 42 of the shell 40. In such a manner, the cushion member(s) 50 on opposing sides of the channel 80 may butt up against the ribs 84, 86 to be properly located in reference thereto, without entering the channel 80.

In addition to functioning as positional locators, the ribs 84, 86 may also better maintain the contour of the seam 100 entering the channel 80. In the absence of ribs 84, 86, it may be expected that when the seam 100 of the second article decorative covering 70 is first positioned in the channel 80 and the remainder of the second article decorative covering 70 is formed over the second article cushion member 50, the second article cushion member 50 will be compressed to a certain extent. Unfortunately, if such compression of the second article cushion member 50 is not maintained uniformly along a length of the channel 80, particularly at the entrance 82 to the channel, the contour of the seam 100 of the second article decorative covering 70 may also be expected to vary and have distortion.

In order to overcome the forgoing difficulty, the ribs 84, 86 support the second article decorative covering 70 at the entrance 82 to the channel 80, particularly with the second article decorative covering 70 directly overlying the ribs 84, 86 without the second article cushion member 50 located there between. In such a manner, the variability of contour of the seam 100 entering the channel 80 due to the compressibility of the second article cushion member 50 is eliminated, particularly as the ribs 84, 86 of the first article decorative covering 40 are not susceptible to compression similar to the second article cushion member 50.

Furthermore, as best shown in FIG. 2B, the upper portion of each sidewall 83, 85 of the channel 80 may include a radius 87, 89 (which also forms the terminal upper end of the ribs 84, 86) in order to better maintain the shape of the seam 100 entering the channel 80. The radius may be in a range of 0.25 mm to 1 mm depending on the thickness and the height of the ribs 84, 86. As shown in the figures, each radius 87, 89 supports each portion 70a, 70b second article decorative covering 70 with smooth rounded transition, here from extending horizontally along a face of the interior trim article 10' to extending vertically in the channel 80.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A method of providing interior trim for a motor vehicle comprising:
    forming a first interior trim article providing a first interior trim level, wherein the first article comprises a first article decorative covering overlying a first article cushion member and a first article substrate, with the first article cushion member located between the first article decorative covering and the first article substrate; and
    forming a second interior trim article having a base structure comprising the first interior trim article;
    wherein the second interior trim article provides a second interior trim level different from the first interior trim level, wherein the second interior trim article comprises a second article decorative covering and a second article cushion member overlying the base structure, with the second article cushion member located between the second article decorative covering and the base structure;
    wherein the first article decorative covering includes an elongated channel;
    wherein the second article decorative covering comprises a plurality of decorative covering segments joined at a joining seam;
    wherein the joining seam is located in the elongated channel; and
    wherein the elongated channel is defined by two opposing sidewalls; and at least a portion of at least one of the sidewalls is formed by an elongated rib which protrudes outward from an upper side of the first article decorative covering.

2. The method of claim 1 wherein:
    at least a portion of each of the sidewalls is formed by an elongated rib which protrudes outward from an upper side of the first article decorative covering.

3. The method of claim 2 wherein:
    forming the second interior trim article using the first interior trim article as the base structure further comprises
    positioning the second article cushion member relative to the first article decorative covering by arranging the second article cushion member over the first article decorative covering and locating the second article cushion member relative to the first article decorative covering using at least one of the elongated ribs as a positional locator; and
    positioning the second article decorative covering relative to the first article decorative covering by arranging the second article decorative covering over the first article decorative covering and locating the second article decorative covering relative to the first article decorative covering using the elongated channel as a positional locator.

4. The method of claim 3 wherein:
    forming the second interior trim article using the first interior trim article as the base structure further comprises
    bonding an upper side of the second article cushion member to a lower side of the second article decorative covering in a mold with heat and pressure; and
    bonding the lower side of the second article cushion member to an upper side of the first article decorative covering in the mold with heat and pressure.

5. The method of claim 4 wherein:
    each of the upper side of the second article cushion member, lower side of the second article cushion member, lower side of the second article decorative covering and upper side of the first article decorative covering are coated with an adhesive coating prior to applying the heat and pressure within the mold.

6. The method of claim 5 wherein:
    at least one of the adhesive coatings comprises a heat activated adhesive.

7. The method of claim 1 wherein:
    the first interior trim article and the second interior trim article are interior trim panels.

8. The method of claim 1 wherein:
    the first interior trim panel and the second interior trim panel are instrument panels or sidewall panels.

9. The method of claim 1 wherein:
    the first article decorative covering is formed of a polymer composition.

10. The method of claim 1 wherein:
    the first article decorative covering is formed by slush molding, rotational molding, injection molding or casting.

11. The method of claim 1 wherein:
    the first article cushion member is formed of a cellular structure.

12. The method of claim 11 wherein:
    the cellular structure is formed by a thermoset polymer composition.

13. The method of claim 1 wherein:
    the first article substrate is formed of a polymer composition.

14. The method of claim 1 wherein:
    the second article cushion member is formed of at least one of a non-woven fabric, woven fabric and a knitted fabric.

15. The method of claim 1 wherein:
    the second article decorative covering is formed of natural leather.

16. The method of claim 1 wherein:
    the channel has a width in a range of 2 mm to 4 mm.

17. The method of claim 1 wherein:
    the channel has a depth in a range of 1.5 mm to 5 mm.

18. The method of claim 1 wherein:
the elongated rib protrudes outward from an upper side of the first article decorative covering in a range of 0.5 mm to 3 mm.

19. The method of claim 1 wherein:
the end of the elongated rib includes a radius.

* * * * *